(12) United States Patent
Shibazaki et al.

(10) Patent No.: US 8,704,860 B2
(45) Date of Patent: Apr. 22, 2014

(54) LIQUID CRYSTAL DISPLAY APPARATUS, LIQUID CRYSTAL DISPLAY APPARATUS DRIVING METHOD, AND TELEVISION RECEIVER

(75) Inventors: Akira Shibazaki, Osaka (JP); Seiji Tanuma, Osaka (JP); Kenji Okamoto, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 218 days.

(21) Appl. No.: 13/321,095

(22) PCT Filed: Mar. 16, 2010

(86) PCT No.: PCT/JP2010/001862
§ 371 (c)(1),
(2), (4) Date: Nov. 17, 2011

(87) PCT Pub. No.: WO2010/134247
PCT Pub. Date: Nov. 25, 2010

(65) Prior Publication Data
US 2012/0056915 A1    Mar. 8, 2012

(30) Foreign Application Priority Data
May 21, 2009   (JP) .................................. 2009-123419

(51) Int. Cl.
G09G 5/10 (2006.01)
G09G 3/36 (2006.01)

(52) U.S. Cl.
USPC .......................................... 345/690; 345/89

(58) Field of Classification Search
USPC .................................................. 345/89, 690
See application file for complete search history.

(56) References Cited

U.S. PATENT DOCUMENTS

| 2004/0201564 A1 | 10/2004 | Sugino et al. |
| 2004/0263495 A1 | 12/2004 | Sugino et al. |
| 2005/0270449 A1* | 12/2005 | Koma et al. ................... 349/114 |
| 2007/0177085 A1* | 8/2007 | Nishiyama et al. ........... 349/117 |
| 2008/0211799 A1 | 9/2008 | Liao |

FOREIGN PATENT DOCUMENTS

| JP | 1-103823 U | 7/1989 |
| JP | 2003-207762 A | 7/2003 |
| JP | 2006-11339 A | 1/2006 |

(Continued)

OTHER PUBLICATIONS

International Search Report for PCT/JP2010/001862, mailed on May 25, 2010.

Primary Examiner — Alexander S Beck
Assistant Examiner — Ibrahim Khan
(74) Attorney, Agent, or Firm — Birch, Stewart, Kolasch & Birch, LLP

(57) ABSTRACT

An overshooting process is carried out, in an LCD device (1) whose LC layer thicknesses meet pixel R>pixel G>pixel B, so as to respectively set first through third output gray scales of current frame based on (i) first through third input gray scales of the current frame (current frame data) and (ii) first through third gray scales of frame which is one frame before the current frame (previous frame data). The first through third output gray scales are respectively set for the first through third pixels based on the thicknesses of the respective first through third liquid crystal layers so as to meet pixel R>pixel G>pixel B. This equalizes liquid crystal response speeds of the respective pixels R, G, and B, and therefore allows an improvement in display quality of the LCD device (1) having a multi gap structure.

12 Claims, 9 Drawing Sheets

(56) References Cited

FOREIGN PATENT DOCUMENTS

| | | |
|---|---|---|
| JP | 2007-233061 A | 9/2007 |
| JP | 2007-233336 A | 9/2007 |
| JP | 2007-248845 A | 9/2007 |
| JP | 2007-256327 A | 10/2007 |
| JP | 2008-158525 A | 7/2008 |

* cited by examiner

FIG. 5

(a) LUT FOR G

| STARTING GRAY SCALE \ ULTIMATE GRAY SCALE | 0 | 32 | 64 | 96 | 128 | 160 | 192 | 224 | 255 |
|---|---|---|---|---|---|---|---|---|---|
| 0 | 0 | 87 | 152 | 178 | 200 | 218 | 239 | 254 | 255 |
| 32 | 0 | 32 | 79 | 128 | 162 | 193 | 222 | 248 | 255 |
| 64 | 0 | 16 | 64 | 108 | 148 | 182 | 213 | 241 | 255 |
| 96 | 0 | 11 | 50 | 96 | 136 | 176 | 209 | 238 | 255 |
| 128 | 0 | 8 | 37 | 84 | 128 | 167 | 203 | 235 | 255 |
| 160 | 0 | 5 | 26 | 72 | 120 | 160 | 197 | 233 | 255 |
| 192 | 0 | 4 | 17 | 62 | 107 | 151 | 192 | 229 | 255 |
| 224 | 0 | 3 | 11 | 47 | 95 | 141 | 186 | 224 | 255 |
| 255 | 0 | 3 | 9 | 34 | 82 | 131 | 177 | 219 | 255 |

(b) LUT FOR R

| STARTING GRAY SCALE \ ULTIMATE GRAY SCALE | 0 | 32 | 64 | 96 | 128 | 160 | 192 | 224 | 255 |
|---|---|---|---|---|---|---|---|---|---|
| 0 | 0 | 110 | 189 | 213 | 231 | 243 | 255 | 255 | 255 |
| 32 | 0 | 32 | 85 | 142 | 176 | 207 | 235 | 255 | 255 |
| 64 | 0 | 9 | 64 | 113 | 156 | 191 | 222 | 248 | 255 |
| 96 | 0 | 2 | 44 | 96 | 139 | 183 | 216 | 244 | 255 |
| 128 | 0 | 0 | 26 | 79 | 128 | 170 | 208 | 240 | 255 |
| 160 | 0 | 0 | 10 | 62 | 117 | 160 | 199 | 237 | 255 |
| 192 | 0 | 0 | 0 | 48 | 98 | 147 | 192 | 231 | 255 |
| 224 | 0 | 0 | 0 | 26 | 81 | 133 | 183 | 224 | 255 |
| 255 | 0 | 0 | 0 | 8 | 62 | 119 | 171 | 217 | 255 |

(c) LUT FOR B

| STARTING GRAY SCALE \ ULTIMATE GRAY SCALE | 0 | 32 | 64 | 96 | 128 | 160 | 192 | 224 | 255 |
|---|---|---|---|---|---|---|---|---|---|
| 0 | 0 | 68 | 121 | 149 | 175 | 198 | 223 | 244 | 255 |
| 32 | 0 | 32 | 74 | 117 | 150 | 181 | 212 | 240 | 255 |
| 64 | 0 | 22 | 64 | 104 | 141 | 174 | 206 | 235 | 255 |
| 96 | 0 | 18 | 55 | 96 | 133 | 170 | 203 | 233 | 255 |
| 128 | 0 | 16 | 46 | 88 | 128 | 165 | 199 | 231 | 255 |
| 160 | 0 | 14 | 39 | 80 | 123 | 160 | 195 | 230 | 255 |
| 192 | 0 | 14 | 33 | 74 | 114 | 154 | 192 | 227 | 255 |
| 224 | 0 | 13 | 30 | 64 | 107 | 148 | 188 | 224 | 255 |
| 255 | 0 | 13 | 28 | 56 | 98 | 141 | 182 | 221 | 255 |

FIG. 8

(a) LUT FOR R/LUT FOR G

|  | ULTIMATE GRAY SCALE | | | | | | | | |
|---|---|---|---|---|---|---|---|---|---|
|  | 0 | 32 | 64 | 96 | 128 | 160 | 192 | 224 | 255 |
| STARTING GRAY SCALE 0 | 0 | 87 | 152 | 178 | 200 | 218 | 239 | 254 | 255 |
| 32 | 0 | 32 | 79 | 128 | 162 | 193 | 222 | 248 | 255 |
| 64 | 0 | 16 | 64 | 108 | 148 | 182 | 213 | 241 | 255 |
| 96 | 0 | 11 | 50 | 96 | 136 | 176 | 209 | 238 | 255 |
| 128 | 0 | 8 | 37 | 84 | 128 | 167 | 203 | 235 | 255 |
| 160 | 0 | 5 | 26 | 72 | 120 | 160 | 197 | 233 | 255 |
| 192 | 0 | 4 | 17 | 62 | 107 | 151 | 192 | 229 | 255 |
| 224 | 0 | 3 | 11 | 47 | 95 | 141 | 186 | 224 | 255 |
| 255 | 0 | 3 | 9 | 34 | 82 | 131 | 177 | 219 | 255 |

(b) LUT FOR B

|  | ULTIMATE GRAY SCALE | | | | | | | | |
|---|---|---|---|---|---|---|---|---|---|
|  | 0 | 32 | 64 | 96 | 128 | 160 | 192 | 224 | 255 |
| STARTING GRAY SCALE 0 | 0 | 68 | 121 | 149 | 175 | 198 | 223 | 244 | 255 |
| 32 | 0 | 32 | 74 | 117 | 150 | 181 | 212 | 240 | 255 |
| 64 | 0 | 22 | 64 | 104 | 141 | 174 | 206 | 235 | 255 |
| 96 | 0 | 18 | 55 | 96 | 133 | 170 | 203 | 233 | 255 |
| 128 | 0 | 16 | 46 | 88 | 128 | 165 | 199 | 231 | 255 |
| 160 | 0 | 14 | 39 | 80 | 123 | 160 | 195 | 230 | 255 |
| 192 | 0 | 14 | 33 | 74 | 114 | 154 | 192 | 227 | 255 |
| 224 | 0 | 13 | 30 | 64 | 107 | 148 | 188 | 224 | 255 |
| 255 | 0 | 13 | 28 | 56 | 98 | 141 | 182 | 221 | 255 |

LIQUID CRYSTAL DISPLAY APPARATUS, LIQUID CRYSTAL DISPLAY APPARATUS DRIVING METHOD, AND TELEVISION RECEIVER

TECHNICAL FIELD

The present invention relates to a liquid crystal display device having a multi gap structure.

BACKGROUND ART

Liquid crystal display devices are more advantageous than CRT (Cathode Ray Tube) display devices in that the liquid crystal display devices (i) are thinner and lighter, (ii) can be driven at a low voltage, and (iii) require less power consumption. This advantage causes the liquid crystal display devices to be used in various electronic devices such as a TV, a notebook PC (personal computers), a desktop PC, a PDA (Personal Digital Assistant), and a mobile phone.

The liquid crystal display devices are driven in a mode such as a TN mode (Twisted Nematic Mode), an STN mode (Super Twisted mode), or a VA mode (Vertically Aligned Mode). In the TN mode and the STN mode, liquid crystal molecules are horizontally aligned. In the VA mode, liquid crystal molecules are vertically aligned. The VA mode out of modes has been widely used in recent years because of its high contrast and its excellent viewing angle characteristic.

In a case of driving a liquid crystal display device in the VA mode, liquid crystal with negative dielectric anisotropy is used to form vertical alignment films on respective two electrodes that face each other. The vertical alignment film causes liquid crystal molecules to be vertically aligned. With the configuration, it is possible to achieve a desired display, by applying a voltage to the liquid crystal molecules, which are vertically aligned between the two electrodes, so that the liquid crystal molecules are tilted in predetermined directions.

Note that the VA mode is a type of a so-called birefringence mode. In the birefringence mode, transmittance is determined in accordance with a phase difference occurring while light is being transmitted through a liquid crystal panel. That is, the transmittance is determined on the basis of refractive index anisotropy ($\Delta n$) of liquid crystal, a thickness (d) of a liquid crystal layer and a wavelength ($\lambda$) of the light. On this account, even if an identical voltage is applied to liquid crystal panels having an identical structure, their voltage-transmittance characteristics (V-T characteristic) vary depending on the wavelengths of the light. The liquid crystal display devices are generally configured by respective pixels R (red), G (green), and B (blue) so as to carry out color display. In the VA mode, transmittance (i.e., light transmittance) varies from color to color, so that tinge varies delicately with a gray scale. Further, each maximum transmittance of a corresponding one of the colors R, G, and B (Tmax (R), Tmax (G), and Tmax (B)) occurs and differs when a corresponding voltage is applied.

FIG. 10 is a graph showing a relation between transmittance and retardation $\Delta n \times d$ (hereinafter, merely referred to as '$\Delta nd$') of liquid crystal at each wavelength in a liquid crystal panel of the VA mode. FIG. 10 shows a change in transmittance with respect to a change in $\Delta nd$ at each wavelength (R: 670 nm, G: 550 nm, and B: 450 nm).

As indicated in FIG. 10, if a thickness of the liquid crystal layer is set to $\Delta nd$ at which luminance becomes a maximum value during white display in the VA mode (i.e., $\Delta nd$ at which transmittance of light with a wavelength of 550 nm becomes a maximum value), then transmittance of light with a wavelength of 450 nm becomes too low. In view of the circumstances, a thickness of a liquid crystal layer has been conventionally set to be smaller than the thickness determined on the basis of the maximum luminance so that color is prevented from appearing in the white display.

On this account, the luminance is darker during the white display in the VA mode than in the TN mode. As such, it is necessary to increase backlight luminance so as to obtain white luminance which is substantially identical to that of a liquid crystal panel of the TN mode.

Note, however, that increasing the backlight luminance requires increasing power consumption of an illumination device. This causes a smaller range of applicability of the liquid crystal panel. In a case where the thickness of the liquid crystal layer is set larger for the sake of white luminance, the transmittance of the light with a wavelength of 450 nm becomes excessively lower than that in the TN mode. This causes a problem that the panel gets yellowish during the white display.

A so-called multi gap structure is known as a technique for addressing such a problem. In the multi gap structure, thicknesses of respective liquid crystal layers are separately set for respective pixels R, G, and B so that the pixels have their respective maximum transmittances in response to an applied driving voltage. Namely, in a liquid crystal display device having the multi gap structure, the thicknesses of the respective liquid crystal layers are separately set for the respective pixels R, G, and B so that the pixels R, G, and B have their respective maximum transmittances when an identical voltage is applied to the pixels R, G, and B. Therefore, in a case where the multi gap structure is applied to a vertical alignment liquid crystal panel in which the display is carried out in the VA mode, it is possible to avoid getting colored during the white display and to attain transmittance which is substantially identical to that of the TN mode.

CITATION LIST

Patent Literature

Patent Literature 1
Japanese Patent Application Publication, Tokukai, No. 2007-233336 A (Publication Date: Sep. 13, 2007)

SUMMARY OF INVENTION

Technical Problem

In general, a response speed of liquid crystal is correlative to a thickness of a liquid crystal layer and a voltage applied to the liquid crystal layer. Therefore, in a case where an identical voltage (an identical gray scale) is applied to respective liquid crystal layers in a liquid crystal display device having the multi gap structure so as to meet, for example, the following inequality (a thickness of a liquid crystal layer in a pixel R)>(a thickness of the liquid crystal layer in a pixel G)>(a thickness of the liquid crystal layer in a pixel B), the following inequality is met (a response speed of liquid crystal in the pixel R)<(a response speed of liquid crystal in the pixel G)<(a response speed of liquid crystal in the pixel B).

On this account, conventional liquid crystal display devices with the multi gap structure have a problem that a color drift occurs during video display. For example, in a case of a video display in which a white window image is moving in a black background image a s illustrated in FIG. 11 (a display in which the white window image is moving rightward on the sheet of FIG. 11), (i) a portion where the color turns from black to white (a right edge portion of the white window image) shows a bluish color and (ii) a portion where the color turns from white to black (a left edge portion of the white window image) shows a yellowish color.

According to the conventional liquid crystal display devices with the multi gap structure, there arises a problem that a display quality is deteriorated by the color drift caused by a difference in response speed between the respective pixels.

The present invention is accomplished in view of the problem. An object of the present invention is to improve a display quality of a liquid crystal display device having a multi gap structure.

Solution to Problem

In order to attain the object, a liquid crystal display device in accordance with the present invention is a liquid crystal display device including: a plurality of scanning signal lines; a plurality of data signal lines; a first pixel including a first liquid crystal layer; a second pixel including a second liquid crystal layer having a thickness smaller than a thickness of the first liquid crystal layer; a third pixel including a third liquid crystal layer having a thickness smaller than the thickness of the second liquid crystal layer; and a gray scale transition emphasis process section for respectively setting first through third output gray scales of a current frame on the basis of (i) first through third input gray scales of the current frame and (ii) first through third gray scales of a frame which is one frame before the current frame, the first through third output gray scales being respectively set for the first through third pixels in accordance with the thicknesses of the respective first through third liquid crystal layer so that (i) the second output gray scale for the second pixel is higher than the third output gray scale for the third pixel and (ii) the first output gray scale for the first pixel is higher than the second output gray scale, in a case where the first through third pixels display an identical gray scale.

Since the present invention employs an overshooting process (gray scale transition emphasis process), the first through third output gray scales of the current frame are respectively set for the pixels R, G, and B in accordance with the thicknesses of the liquid crystal layers in the respective pixels R, G, and B. For example, in a case where the thicknesses of the liquid crystal layers in the respective pixels R, G, and B meet the following inequality the pixel R>the pixel G>the pixel B (multi gap structure), response speeds of liquid crystal in the respective pixels R, G, and B meet the pixel R<the pixel G<the pixel B. As such, the first output gray scale (applied voltage) for the pixel R is set higher than the second output gray scale (applied voltage) for the pixel G, and the third output gray scale for the pixel B is set higher than the second output gray scale (applied voltage) for the pixel G. That is, the first through third output gray scales for the respective pixels R, G, and B are set so as to meet the following inequality the pixel R>the pixel G>the pixel B. This allows the response speeds of liquid crystal in the respective pixels R, G, and B to approximate one another.

With the configuration, it is possible to compensate the differences in response speed caused by the differences in thickness of the liquid crystal layers in the respective pixels R, G, and B, by setting the output gray scales for the respective pixels R, G, and B. This makes it possible to avoid a color drift during video display caused by the differences in response speed. It is therefore possible to improve the display quality.

Another liquid crystal display device in accordance with the present invention is a liquid crystal display device including: a plurality of scanning signal lines; a plurality of data signal lines; a first pixel including a first liquid crystal layer; a second pixel including a second liquid crystal layer having a thickness equal to a thickness of the first liquid crystal layer; a third pixel including a third liquid crystal layer having a thickness smaller than the thickness of the first liquid crystal layer and the thickness of the second liquid crystal layer; and a gray scale transition emphasis process section for respectively setting first through third output gray scales of a current frame on the basis of (i) first through third input gray scales of the current frame and (ii) first through third gray scales of a frame which is one frame before the current frame, the first through third output gray scales being respectively set for the first through third pixels in accordance with the thicknesses of the respective first through third liquid crystal layers at least so that the first and second output gray scales for the first and second pixels, respectively, are higher than the third output gray scale for the third pixel, in a case where the first through third pixels display an identical gray scale.

Since the present invention employs an overshooting process (gray scale transition emphasis process), the first through third output gray scales of the current frame are respectively set for the pixels R, G, and B in accordance with the thicknesses of the liquid crystal layers in the respective pixels R, G, and B. For example, in a case where the thicknesses of the liquid crystal layers in the respective pixels R, G, and B meet the following inequality the pixel R=the pixel G>the pixel B (semi-multi gap structure), response speeds of liquid crystal in the respective pixels R, G, and B meet the pixel R=the pixel G<the pixel B. As such, the first output gray scale (applied voltage) for the pixel R is set higher than the third output gray scale (applied voltage) for the pixel B, and the second output gray scale for the pixel G is set higher than the third output gray scale (applied voltage) for the pixel B. That is, the first through third output gray scales for the respective pixels R, G, and B are set so as to meet, for example, the following inequality the pixel R=the pixel G>the pixel B. This allows the response speeds of liquid crystal in the respective pixels R and B to approximate each other, and also allows the response speeds of liquid crystal in the respective pixels G and B to approximate each other.

With the configuration, it is possible to compensate the differences in response speed caused by the differences in thickness of the liquid crystal layers in the respective pixels R, G, and B, by setting the output gray scales for the respective pixels R, G, and B. This makes it possible to avoid a color drift during video display caused by the differences in response speed. It is therefore possible to improve the display quality.

In order to attain the object, a driving method for driving a liquid crystal display device in accordance with the present invention is a driving method for driving a liquid crystal display device, said liquid crystal display device including: a plurality of scanning signal lines; a plurality of data signal lines; a first pixel including a first liquid crystal layer; a second pixel including a second liquid crystal layer having a thickness smaller than a thickness of the first liquid crystal layer; and a third pixel including a third liquid crystal layer having a thickness smaller than the thickness of the second liquid crystal layer, said driving method comprising the step of: respectively setting first through third output gray scales of a current frame on the basis of (i) first through third input gray scales of the current frame and (ii) first through third gray scales of a frame which is one frame before the current frame, the first through third output gray scales being respectively set for the first through third pixels in accordance with the thicknesses of the respective first through third liquid crystal layers so that (i) the second output gray scale for the second pixel is higher than the third output gray scale for the third pixel and (ii) the first output gray scale for the first pixel is higher than the second output gray scale, in a case where the first through third pixels display an identical gray scale.

In order to attain the object, another driving method for driving a liquid crystal display device in accordance with the present invention is a driving method for driving a liquid crystal display device, said liquid crystal display device including: a plurality of scanning signal lines; a plurality of data signal lines; a first pixel including a first liquid crystal layer; a second pixel including a second liquid crystal layer having a thickness equal to a thickness of the first liquid crystal layer; and a third pixel including a third liquid crystal layer having a thickness smaller than the thickness of the first liquid crystal layer and the thickness of the second liquid crystal layer, said driving method comprising the step of: respectively setting first through third output gray scales of a current frame on the basis of (i) first through third input gray scales of the current frame and (ii) first through third gray scales of a frame which is one frame before the current frame, the first through third output gray scales being respectively set for the first through third pixels in accordance with the thicknesses of the respective first through third liquid crystal layers at least so that the first and second output gray scales for the first and second pixels, respectively, are higher than the third output gray scale for the third pixel, in a case where the first through third pixels display an identical gray scale.

The driving methods can bring about an effect brought about by the configurations of the liquid crystal display devices.

Advantageous Effects of Invention

As described above, in the liquid crystal display device of the present invention and the method of the present invention, for driving the liquid crystal display device, the first through third output gray scales being respectively set for the first through third pixels in accordance with the thicknesses of the respective first through third liquid crystal layer so that (i) the second output gray scale for the second pixel is higher than the third output gray scale for the third pixel and (ii) the first output gray scale for the first pixel is higher than the second output gray scale. This makes it possible to compensate a difference in response speed between respective pixels R, G, and B in a liquid crystal display device having a multi gap structure. It is therefore possible to avoid a color drift during video display.

BRIEF DESCRIPTION OF DRAWINGS

FIG. 4 is a cross sectional view of a cross section (multi gap structure) of a liquid crystal panel in accordance with Example 1.

FIG. 5 shows look-up tables (LUTs) of pixels of respective colors in accordance with Example 1. (a) of FIG. 5 shows an LUT for a pixel G. (b) of FIG. 5 shows an LUT for a pixel R. (c) of FIG. 5 shows an LUT for a pixel B.

FIG. 7 is a cross sectional view illustrating a cross section (semi-multi gap structure) of a liquid crystal panel in accordance with Example 2.

FIG. 8 shows look-up tables (LUTs) of the pixels of respective colors in accordance with Example 2. (a) of FIG. 8 shows an LUT for a pixel R and a pixel G. (b) of FIG. 8 is an LUT for a pixel B.

Figure 12:
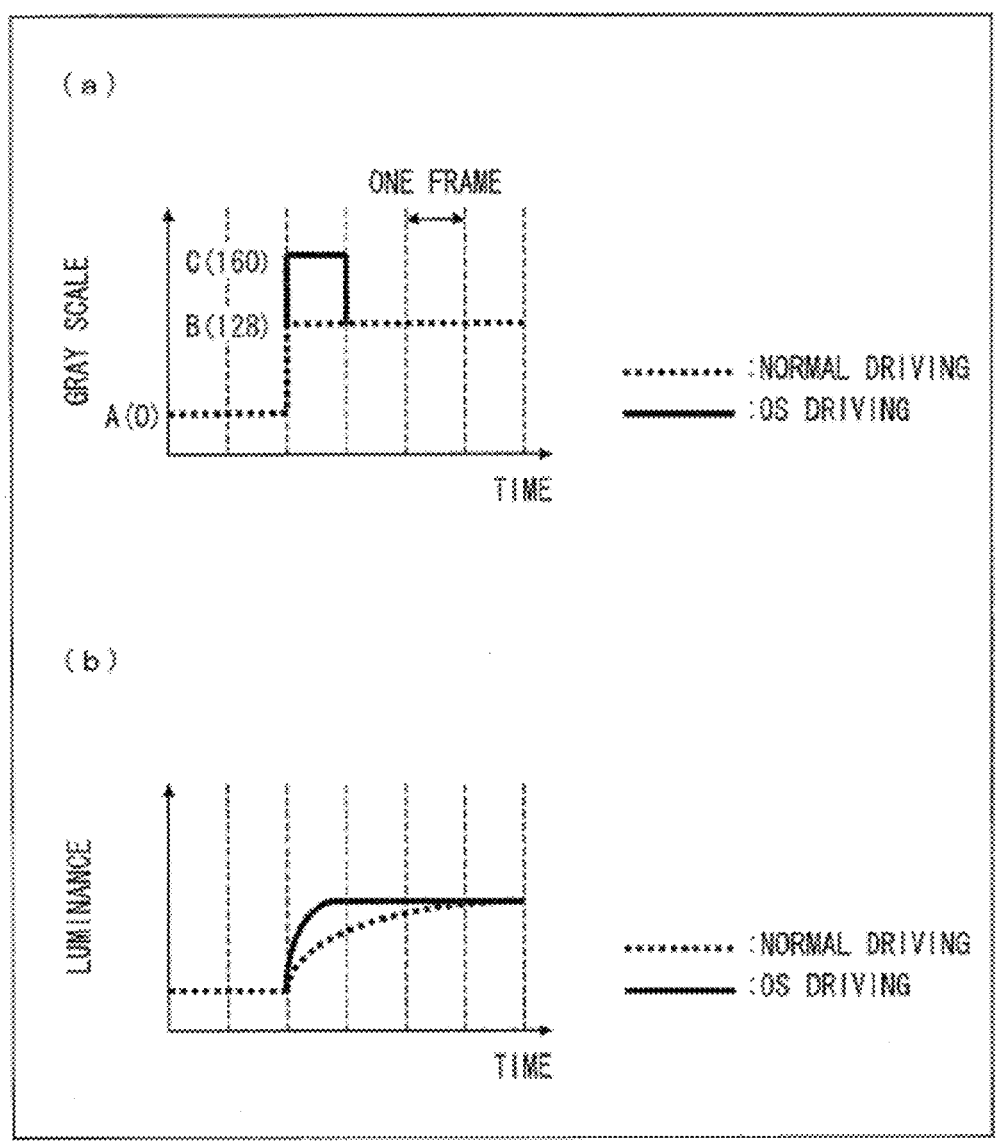

(a) of FIG. 12 is a diagram showing a relation between time and a gray scale data to be written in a pixel in a case where overshoot driving is carried out when a gray scale of 0 (black) in a previous frame is changed to a gray scale of 128 (halftone) in a current frame. (b) of FIG. 12 is a waveform chart of a response waveform of liquid crystal which waveform is obtained on the basis of (a) of FIG. 12.

DESCRIPTION OF EMBODIMENTS

Figure 2:
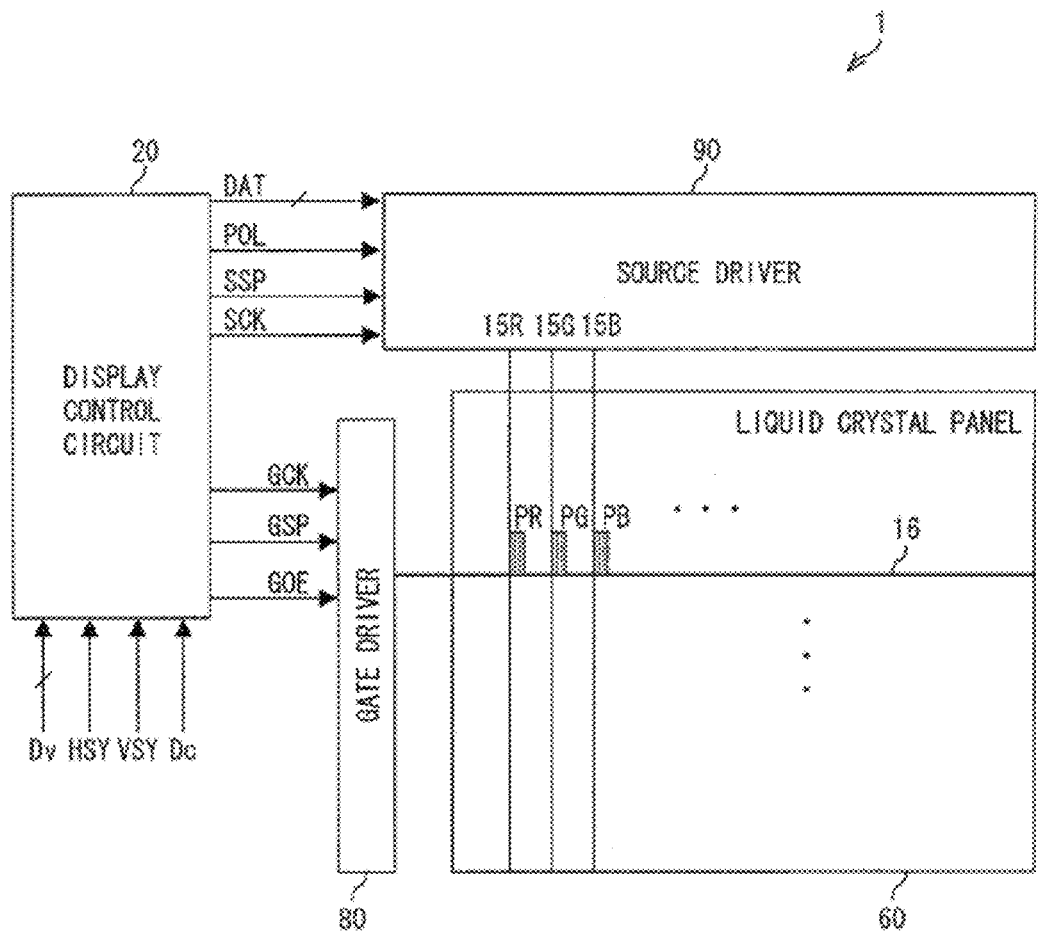
FIG. 2 is a block diagram illustrating a configuration of the liquid crystal display device in accordance with the present embodiment.

The present embodiment will be described below with reference to drawings. FIG. 2 is a block diagram illustrating a liquid crystal display device 1 in accordance with the present embodiment. As illustrated in FIG. 2, the liquid crystal display device 1 includes a liquid crystal panel 60, a display control circuit 20, a gate driver 80, and a source driver 90. The liquid crystal panel 60 is provided with data signal lines (15R, 15G, and 15B), scanning signal lines 16, a pixel for red (pixel R) PR, a pixel for green (pixel G) PG, a pixel for blue (pixel B) PB, and retention capacitor wiring (Cs wiring, not shown). Note that the data signal line 15R is connected with the pixel R, the data signal line 15G is connected with the pixel G, and the data signal line 15B is connected with the pixel B.

The display control circuit 20 receives, from an external signal source (e.g. tuner), a digital video signal Dv (input image data), a horizontal sync signal HSY, a vertical sync signal VSY, and a control signal Dc for controlling display operation. The display control circuit 20 generates, on the basis of the signals (Dv, HSY, VSY, and Dc) thus received, a source start pulse signal SSP, a source clock signal SCK, a source polarity signal POL, an image data signal DAT (digital signal), a gate start pulse signal GSP, a gate clock signal GCK, and a gate driver output control signal GOE. The display control circuit 20 supplies the source start pulse signal SSP, the source clock signal SCK, the source polarity signal POL, and the image data signal DAT to the source driver 90, and supplies the gate start pulse signal GSP, the gate clock signal GCK, and the gate driver output control signal GOE to the gate driver 80. Note that the liquid crystal display device 1 carries out, with respect to the digital video signal Dv (input image data), an overshooting process in a frame which comes immediately after a gray scale has changed, and then an image is displayed on the basis of pieces of image data (image data signal DAT) which have been subjected to the overshooting process. The overshooting process will be later described in detail.

The gate driver 80 drives the scanning signal lines 16 in response to the gate start pulse signal GSP, the gate clock signal GCK, and the gate driver output control signal GOE. The source driver 90 drives the data signal lines (15R, 15G, and 15B) in response to the source start pulse signal SSP, the source clock signal SCK, and the image data signal DAT. Specifically, the source driver 90 supplies, to the data signal lines (15R, 15G, and 15B), analog signal electric potentials corresponding to the image data signal DAT at timing determined by the source start pulse signal SSP, the source clock signal SCK, and the source polarity signal POL.

Figure 3:
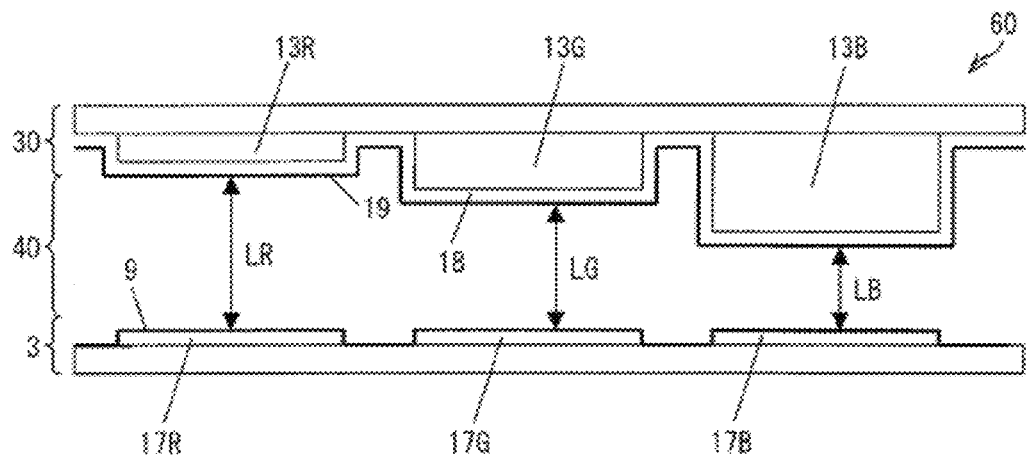
FIG. 3 is a cross sectional view illustrating a cross section (multi gap structure) of a liquid crystal panel in accordance with Example 1.

FIG. 3 is a partial cross section illustrating the liquid crystal panel 60 of FIG. 2. As illustrated in FIG. 3, the crystal panel 60 includes an active matrix substrate 3, a color filter substrate 30, and a liquid crystal layer 40 which is provided between the active matrix substrate 3 and the color filter substrate 30. The active matrix substrate 3 is provided with the data signal lines (not shown), the scanning signal lines (not shown), various insulating films (not shown), transistors (not shown), and the retention capacitor wiring (not shown), pixel electrodes 17R, 17G, and 17B, and an alignment film 9 covering the pixel electrodes 17R, 17G, and 17B. The color filter substrate 30 is provided with color filters 13R, 13G, and 13B for the pixel electrodes 17R, 17G, and 17B, respectively, a counter electrode 18 covering the color filters 13R, 13G, and 13B, and an alignment film 19 covering the counter electrode 18. The pixel R PR (See FIG. 2) includes the pixel electrode 17R, the counter electrode 18, and a liquid crystal layer LR sandwiched between the pixel electrode 17R and the counter electrode 18. The pixel G PG (See FIG. 2) includes the pixel electrode 17G, the counter electrode 18, and a liquid crystal layer LG sandwiched between the pixel electrode 17G and the counter electrode 18. The pixel B PB (See FIG. 2) includes the pixel electrode 17B, the counter electrode 18, and a liquid crystal layer LB sandwiched between the pixel electrode 17B and the counter electrode 18.

In liquid crystal display devices having the multi gap structure, liquid crystal layers of pixels have their respective different thicknesses ((a thickness of the liquid crystal layer in a pixel R)>(a thickness of the liquid crystal layer in a pixel G)>(a thickness of the liquid crystal layer in a pixel B)). This causes the pixels to have their respective different response speeds of liquid crystal ((a response speed of the pixel R)<(a response speed of the pixel G)<(a response speed of the pixel B)), in a case where an identical voltage (gray scale) is applied to the pixels. The difference in response speed leads to a problem of deterioration in display quality especially during video display.

In this respect, the liquid crystal display device 1 of the present embodiment employs a configuration in which the difference in response speed of liquid crystal between the pixels R, G, and B is reduced by use of the overshoot driving (i.e., the response speeds of liquid crystal are made equal among the pixels). This allows an improvement in display quality. The following description will discuss, with concrete illustration, a configuration in which a display is carried out by use of the overshoot driving in the liquid crystal panel having the multi gap structure.

First, how the overshoot driving generally operates will be described below. The overshoot driving is a driving method in which a comparison is made between image data of a current frame and image data of a frame which is one frame before the current frame, and corrected image data, made based on a relation obtained by such a comparison, is applied (see (a) of FIG. 12). What is exactly meant by 'the relation' is that image data having a gray scale for overshooting is applied so that a difference between the gray scale for overshooting and a previous gray scale of image data of a previous frame is greater than a difference between the previous gray scale and a current gray scale of input image data of a current frame. Note that the previous frame is one frame before a current frame.

In general, the greater a difference in gray scale level between a gray scale (gray scale) A of a frame and a gray scale B of a next frame is, the faster a liquid crystal layer is switched from the gray scale level A to the gray scale B (the faster the liquid crystal layer responds). In a case of, for example, a rise response where the gray scale A<the gray scale B as shown in (a) of FIG. 12, a gray scale C (the gray scale B<the gray scale C) is supplied during one (1) frame, and subsequently the target gray scale B is supplied. This allows the liquid crystal layer to be switched faster than it is normally switched from the gray scale A to the gray scale B. For example, in a case where the image data of the previous frame has a gray scale A of V0 and a target gray scale B for the input image data of the current frame is V128, V160 is supplied as the gray scale C.

The supplying of such a gray scale value makes it possible to obtain a response waveform in which the liquid crystal layer has a fast rising edge in response to a change in gray scale (see (b) of FIG. 12).

As described above, the overshoot driving is a driving method in which a voltage different from a usual voltage is applied only in a frame immediately after a gray scale has changed. Note that an amount of change (difference) between a normal voltage and a voltage in an overshooting period varies depending on a relation between a gray scale to be applied before the change (to be applied during a previous frame) and a gray scale to be applied after the change (to be applied during a current frame). Thus, luminance of a certain gray scale does not always change to a fixed value. Also note that it is possible to find, by calculation or by use of a look-up table, a gray scale value which causes a voltage, for the overshoot driving, higher than a normal voltage to be applied for a target gray scale. That is, it is possible to find, by calculation or by use of a look-up table, a gray scale value that is found on the basis of a relation between the gray scale to be applied before the change (previous frame) and the gray scale to be applied after the change (present frame).

The liquid crystal display device 1 of the present embodiment employs the overshoot driving, and has a feature in which a concrete method for the overshooting process is employed.

Figure 1:
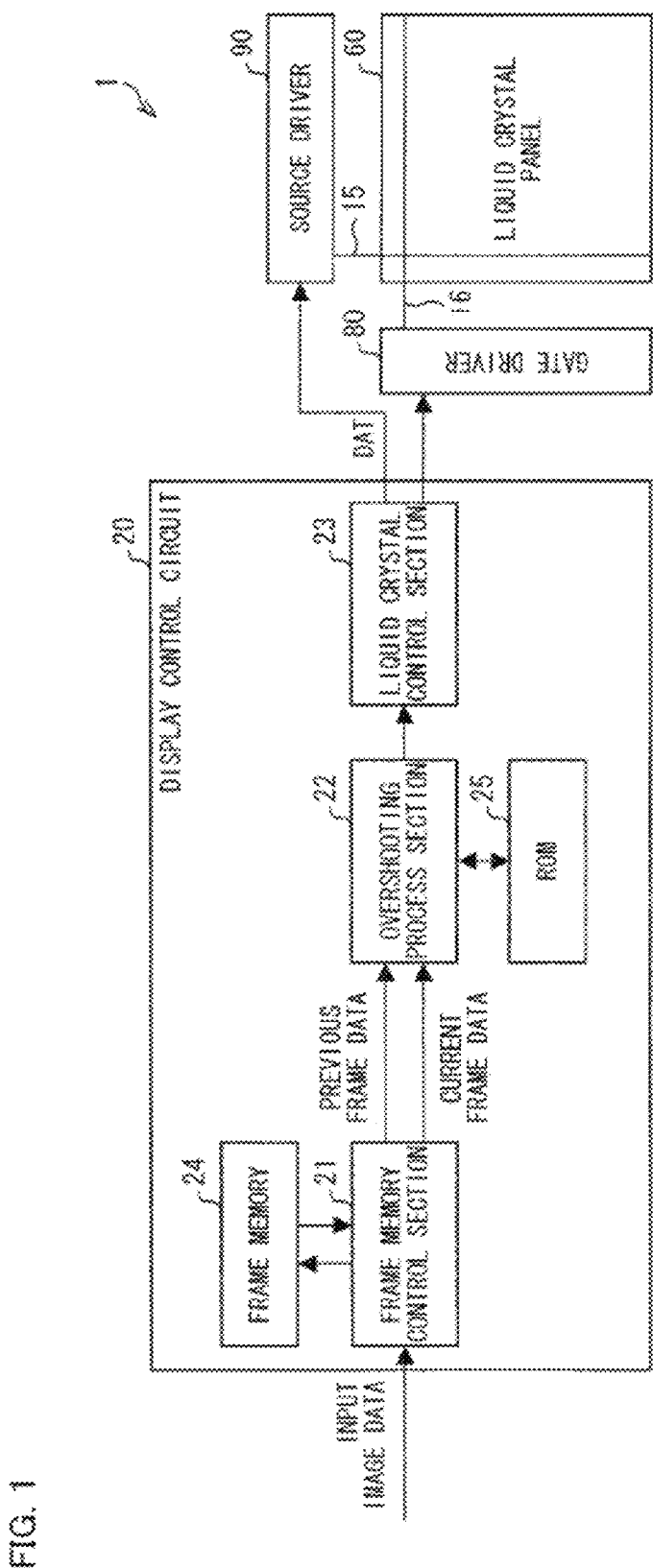
FIG. 1 is a schematic block diagram illustrating a display control circuit of a liquid crystal display device in accordance with the present embodiment.

FIG. 1 is a schematic view illustrating the display control circuit 20 in the liquid crystal display device 1 of the present embodiment. The display control circuit 20 has a function of supplying various control signals (POL, SSP, SCK, GCK, GSP, and GOE) to the drivers (the gate driver 80, the source driver 90) as early described. The display control circuit 20 further has a function of carrying out the overshooting process in which a gray scale is converted in response to the digital video signal Dv (input image data, input gray scale data) received from the external signal source. The display control circuit 20 includes a frame memory control section 21, an overshooting process section 22, a liquid crystal control section 23, a frame memory 24, and a ROM 25.

The following description will discuss, with reference to FIG. 1, a flow of an image data process in the liquid crystal display device 1, as well as functions of the respective sections.

As illustrated in FIG. 1, image data (input image data) supplied to the display control circuit 20 is first supplied to the frame memory control section 21. The frame memory control section 21 stores the supplied image data of a current frame in the frame memory 24. Further, the frame memory control section 21 reads out image data of the frame which is (i) one frame before the current frame (the previous frame data indicated in FIG. 1) and (ii) already stored in the frame memory 24, and then supplies, to the overshooting process section 22, read-out image data together with supplied image data of the current frame (the current frame data indicated in FIG. 1).

The overshooting process section 22 carries out the overshooting process (a gray scale transition emphasis process step). Specifically, the overshooting process section 22 refers to LUTs (look-up tables), which are stored in the ROM 25, on the basis of the image data of the current frame and the image data of the frame which is one frame before the current frame, both of which image data were obtained from the frame memory control section 21. Then, the overshooting process section 22 determines (sets) pieces of image data for the respective pixels R, G, and B (data having been subjected to gray scale conversion, output gray scale) to be applied during the overshooting period in the current frame. Note that LUTs for the respective pixels R, G, and B (an LUT for pixel R, an LUT for pixel G, and an LUT for pixel B) are stored in the ROM 25. The LUTs will be later described in detail.

The overshooting process section 22 subsequently supplies, to the liquid crystal control section 23, the image data (data having been subjected to the gray scale conversion) determined by referring to the LUTs. The liquid crystal control section 23 generates, on the basis of supplied data having been subjected to the gray scale conversion, the image data signal DAT to be applied during the overshooting period, and then supplies the image data signal DAT to the source driver 90. Note that the liquid crystal control section 23 supplies various control signals (see FIG. 2) to the source driver 90 and the gate driver 80. The liquid crystal panel 60 displays an image on the basis of various drive signals (gate signal, data signal) supplied from the gate driver 80 and the source driver 90. Note that, in the frame (current frame) which comes immediately after the gray scale has changed, an image is displayed on the basis of the data having been subjected to the gray scale conversion, and during the following frame (next frame), an image is displayed on the basis of a target original input image data (input gray scale).

The following description will discuss the overshooting process of the present embodiment. The following description will deal with a case where (i) the drivers 60 (the gate driver 80, the source driver 90) for driving the liquid crystal panel are respective 8-bit drivers and (ii) the input gray scale data (input image data) supplied to the display control circuit 20 is an 8-bit data. Note, however, that the present invention is not limited to such a case.

(Example 1)

As early described, FIG. 3 is a schematic cross-sectional view illustrating the liquid crystal panel 60 having the multi gap structure. A thickness $d_R$ (μm) of the liquid crystal layer LR in the pixel R and a thickness $d_B$ (μm) of the liquid crystal layer LB in the pixel B are expressed by the following formulae, where (i) d (μm) is a thickness $d_G$ of the liquid crystal layer LG in the pixel G and (ii) g (μm) is a difference ($d_R-d_G$) between the thickness $d_G$ of the liquid crystal layer LG in the pixel G and the thickness $d_R$ of the liquid crystal layer LR in the pixel R and also a difference ($d_G-d_B$) between the thickness $d_G$ of the liquid crystal layer LG in the pixel G and the thickness $d_B$ of the liquid crystal layer LB in the pixel B.

[thickness $d_R$ of liquid crystal layer LR in pixel R]= (d+g)

[thickness $d_B$ of liquid crystal layer LB in pixel B]= (d−g)

The thicknesses of the liquid crystal layers in the respective pixels R, G, and B are expressed as a ratio by the following formula where the thickness of the liquid crystal layer LG in the pixel G is a reference thickness.

$$d_R:d_G:d_B = (d+g):d:(d-g)$$
$$= [1+(g/d)]:1:[1-(g/d)]$$

Note that a response speed of liquid crystal is in inverse proportion to the square of a thickness of a liquid crystal layer. Therefore, a ratio of response speeds of liquid crystal in the respective pixels R, G, and B is expressed by the following formula where a response speed $T_G$ of the liquid crystal in the pixel G is a reference response speed.

$$T_R:T_G:T_B=[1/\{1+(g/d)\}^2]:1:[1/\{1-(g/d)\}^2]$$

Note that a response speed of liquid crystal is correlative to a voltage (output gray scale) to be applied to the liquid crystal layer. Therefore, in order to (substantially) equalize the response speeds of liquid crystal in the pixels for the respective R, G, and B, it is only necessary that a ratio of the amounts of gray scale transitions of the respective pixels R, G, and B satisfy the following relational expression where an amount $S_G$ of gray scale transition in the pixel G is a reference amount of gray scale transition.

$$S_R:S_G:S_B=\{1+(g/d)\}^2:1:\{1-(g/d)\}^2 \quad (1)$$

The first term and the third term of the right side of the relational expression (1) are defined as 'gray scale conversion parameters' with respect to the reference amount of gray scale transition (preset amount of gray scale transition in the pixel G).

The amounts of gray scale transitions in the respective pixels R, G, and B are found on the basis of the gray scale conversion parameters thus calculated. And, the pieces of image data (output gray scales) of the respective pixels R, G, and B to be applied during the overshooting period are determined.

Figure 4:
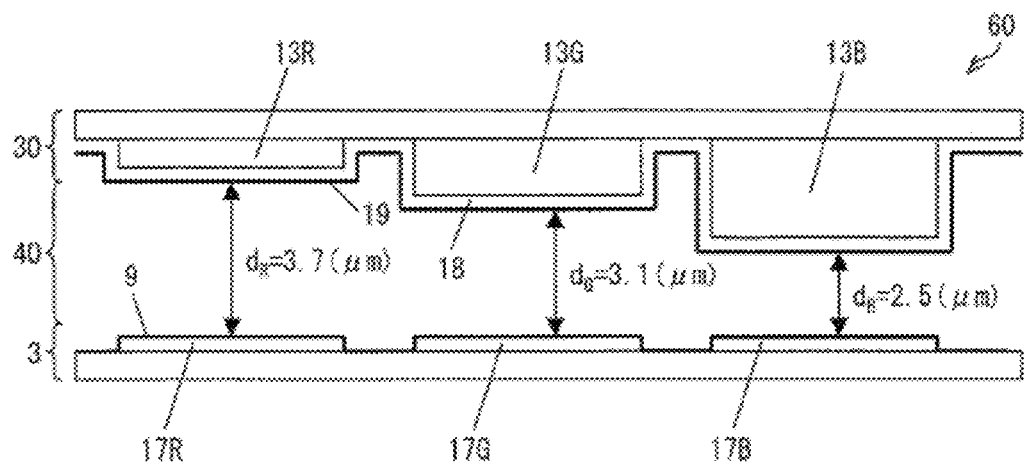
FIG. 4 illustrates a concrete example of Example 1. Specifically.

A concrete example will be described below. As illustrated in FIG. 4, it is assumed that (i) the thickness $d_G$ of the liquid crystal layer LG in the pixel G is equal to 3.1 (μm) and (ii) the difference g in thickness between the liquid crystal layer of the pixel R and the liquid crystal layer of the pixel G=the difference g in thickness between the liquid crystal layer in the pixel G and the liquid crystal layer in the pixel B of is equal to 0.6 (μm). This example describes a case of a gray scale transition of the image data from a gray scale of 64 to a gray scale of 128 (i.e., a case in which pieces of image data of a frame which is one frame before a current frame has a gray scale of 64 and pieces of image data of the current frame has a gray scale (input gray scale) of 128).

Here, the amounts of gray scale transitions (overshooting amounts) in the respective pixels R and B are calculated while assuming that the amount of the gray scale transition in the pixel G is a reference one. First, a reference amount of gray scale transition in the pixel G is determined by measuring a response speed of the liquid crystal in the pixel G. In a case where the amount of gray scale transition in the pixel G is set, for example, to a gray scale of 20 (reference amount of gray scale transition) on the basis of a measured response speed, the amounts of gray scale transitions in the respective pixels R and B are calculated as follows on the basis of the gray scale conversion parameters of the relational expression (1).

$$[\text{amount of grey scale transition in pixel } R] = [\text{reference amount of grey scale transition}] \times$$
$$= [\text{grey scale conversion parameter}]$$
$$= 20 \text{ (grey scale)} \times \{1 + (0.6/3.1)\}^2$$
$$= 28 \text{ (grey scale)}$$

$$[\text{amount of grey scale transition in pixel } B] = [\text{reference amount of grey scale transition}] \times$$
$$= [\text{grey scale conversion parameter}]$$
$$= 20 \text{ (grey scale)} \times \{1 + (0.6/3.1)\}^2$$
$$= 13 \text{ (grey scale)}$$

Thus, the output gray scales of the pieces of image data (data having been subjected to the gray scale conversion) of the respective pixels R, G and B to be applied during the overshooting period are calculated as follows.

$$[\text{output grey scale of pixel } R] = [\text{input gray scale of current frame}] + [\text{amount of grey scale transition}]$$
$$= 128 \text{ (grey scale)} + 28 \text{ (grey scale)}$$
$$= 156 \text{ (grey scale)}$$

$$[\text{output grey scale of pixel } G] = [\text{input gray scale of current frame}] + [\text{amount of grey scale transition}]$$
$$= 128 \text{ (grey scale)} + 20 \text{ (grey scale)}$$
$$= 148 \text{ (grey scale)}$$

$$[\text{output grey scale of pixel } B] = [\text{input gray scale of current frame}] + [\text{amount of grey scale transition}]$$
$$= 128 \text{ (grey scale)} + 13 \text{ (grey scale)}$$
$$= 141 \text{ (grey scale)}$$

The image data signals DAT are generated on the basis of the output gray scales thus calculated (pixel R: a gray scale of 156, pixel G: a gray scale of 148, pixel B: a gray scale of 141). The data signals are supplied to the liquid crystal panel 60 in accordance with the image data signals DAT. Specifically, in a first frame (the frame which comes immediately after the gray scale has changed), the overshooting process is carried out with respect to the input image data (input gray scale) of a gray scale of 128, so that a data signal corresponding to a gray scale of 156 for the pixel R, a data signal corresponding to a gray scale of 148 for the pixel G, and a data signal corresponding to a gray scale of 141 for the pixel B are supplied to the liquid crystal panel 60. In a second frame, data signals corresponding to the target input gray scales (pixel R: a gray scale of 128, pixel G: a gray scale of 128, pixel B: a gray scale of 128) are supplied to the liquid crystal panel 60.

Here, gray scale values (output gray scales), calculated as described above, of the pieces of data having been subjected to the respective gray scale conversions are shown in respective tables shown in (a), (b), and (c) of FIG. 5. In each of the tables shown in (a), (b), and (c) of FIG. 5, the leftmost column indicates gray scale values (starting gray scales) which have not been subjected to respective transitions (gray scale values of a frame which is one frame before), and the uppermost row indicates gray scale values (ultimate gray scales, target gray scales) which have been subjected to the respective transitions (gray scale values of a current frame). Each gray scale value of crossing points of the starting gray scales and the ultimate gray scales indicates a corresponding gray scale value (output gray scale) to be used during the overshooting period.

In the example, in which the pixel G serves as the reference, the gray scale values of the pixel G to be used during the overshooting period are in advance set to values shown in (a) of FIG. 5 on the basis of a measured result of the response speeds. The gray scale values of the pixel R and the pixel B used during the overshooting period are calculated as shown in respective (b) and (c) of FIG. 5 on the basis of the gray scale values shown in (a) of FIG. 5 and the gray scale conversion parameters in the relational expression (1). The tables shown in (a), (b), and (c) of FIG. 5 are stored as the LUTs (the LUTs for respective G, R, and B) in the ROM 25. This allows the overshooting process section 22 (see FIG. 1) to determine pieces of image data (data having been subjected to the gray scale conversion) for the respective pixels R, G, and B used during the overshooting period, by referring to the LUTs for the respective pixels R, G, and B stored in the ROM 25 on the basis of the image data of the frame which is one frame before and the image data of the current frame.

As described above, in the liquid crystal display device 1, the frame memory control section 21 stores the image data (image data of a gray scale of 128) of the current frame in the frame memory 24, the image data being supplied from the external signal source. Further, the frame memory control section 21 reads out the image data (image data of a gray scale of 64) of the frame which is one frame before the current frame, which image data is already stored in the frame memory 24. The frame memory control section 21 supplies, to the overshooting process section 22, the image data of the frame which is one frame before the current frame together with the current frame data of a gray scale of 128. On the basis of the previous frame data of a gray scale of 64 and the current frame data of a gray scale of 128, the overshooting process section 22 refers to the LUTs stored in the ROM 26 and obtains the pieces of data of the current frame which have been subjected to the gray scale conversions for the respective pixels (pixel R: a gray scale of 156, pixel G: a gray scale of 148, pixel B: a gray scale of 141). The overshooting process section 22 then supplies, to the liquid crystal control section 23, obtained pieces of data which have been subjected to the gray scale conversion. The liquid crystal control section 23 supplies, to the source driver 90, the image data signals which are based on the pieces of data having been subjected to the gray scale conversion. This causes the data signals to be supplied to the liquid crystal panel 60 in accordance with the respective pieces of data having been subjected to the gray scale conversions.

Figure 11:
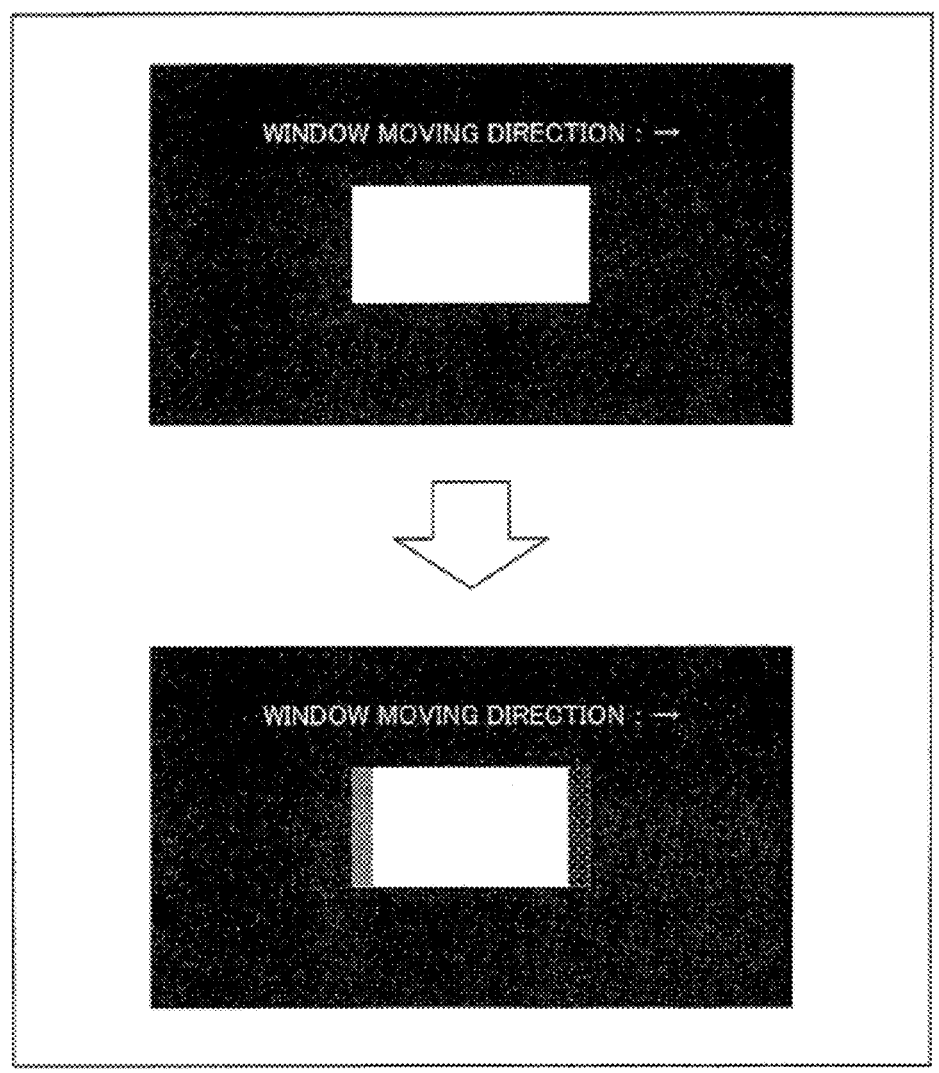
FIG. 11 is a view illustrating video display in a conventional liquid crystal display device.

It is thus possible to (substantially) equalize the response speeds of liquid crystal in the respective pixels R, G, and B, by displaying, in the frame (current frame) which comes immediately after the gray scale has changed, an image by use of the pieces of image data (output gray scales) which have been subjected to the overshooting process. This makes it possible to eliminate colored edges occurred during video display as illustrated in FIG. 11. That is, it becomes possible to improve the display quality of the liquid crystal display device having the multi gap structure.

Note that, in a case as described above where a relation of thicknesses of the liquid crystal layers in the respective pixels R, G, and B meets the following inequality (a thickness of the liquid crystal layer in the pixel R)>(a thickness of the liquid crystal layer in the pixel G)>(a thickness of the liquid crystal layer in the pixel B), the liquid crystal display device of Example 1 can employ a configuration in which the pieces of data (output gray scales) having been subjected to the gray scale conversions for the respective pixels R, G, and B meet either of the following relations, i.e., (an output gray scale of the pixel R)>(an output gray scale of the pixel G)=(an output gray scale of the pixel B) or (an output gray scale of the pixel R)=(an output gray scale of the pixel G)>(an output gray scale of the pixel B). With the configuration, response speeds of liquid crystal in some of the pixels (the pixel R and the pixel G or the pixel G and the pixel B) approximate each other. This makes it possible to reduce colored edges occurred during video display.

(Example 2)

Figure 6:
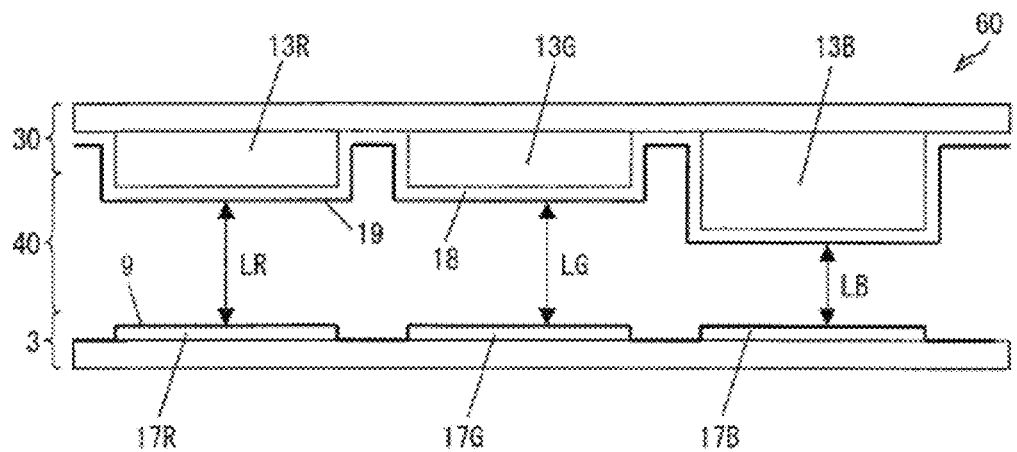
FIG. 6 is a cross sectional view illustrating a cross section (semi-multi gap structure) of a liquid crystal panel in accordance with Example 2.

FIG. 6 is a schematic cross-sectional view illustrating a liquid crystal panel having another multi gap structure (so-called semi-multi gap structure). The configuration of the liquid crystal panel illustrated in FIG. 6 is identical to that of the liquid crystal panel 60 illustrated in FIG. 3, except that the thickness $d_G$ of the liquid crystal layer LG in the pixel G is equal to a thickness $d_R$ of the liquid crystal layer LR in the pixel R in the liquid crystal panel illustrated in FIG. 6 ((the thickness $d_R$ of the liquid crystal layer LR in the pixel R)=(the thickness $d_G$ of the liquid crystal layer LG in the pixel G)>(a thickness $d_B$ of the liquid crystal layer LB in the pixel B)). Therefore, the liquid crystal display device of Example 2 operates in the same manner as the liquid crystal display device 1 illustrated in FIG. 2. Note that the liquid crystal display device of Example 2 can employ a configuration in which the following relation is met, i.e., (the thickness $d_R$ of the liquid crystal layer LR in the pixel R)>(the thickness $d_G$ of the liquid crystal layer LG in the pixel G)=(the thickness $d_B$ of the liquid crystal layer LB in the pixel B).

The thickness $d_B$ of the liquid crystal layer LB in the pixel B can be expressed as follows, where (i) d (μm) is the thickness $d_R$ of the liquid crystal layer LR in the pixel R and is also the thickness $d_G$ of the liquid crystal layer LG in the pixel G and (ii) g (μm) is a difference ($d_R$−$d_B$) in thickness between the liquid crystal layer LR in the pixel R and the liquid crystal layer LB in the pixel B and is also a difference ($d_G$−$d_B$) in thickness between the liquid crystal layer LG in the pixel G and the liquid crystal layer LB in the pixel B.

[thickness $d_B$ of liquid crystal layer LB in pixel B] = (d−g)

The thicknesses of liquid crystal in the respective pixels R, G, and B are expressed as a ratio by the following formula where the thicknesses of liquid crystal in the respective pixels R and G are reference thicknesses.

$$d_R : d_G : d_B = d : d : (d-g)$$
$$= 1 : 1 : [1 - (g/d)]$$

Note that a response speed of a liquid crystal layer is in inverse proportion to the square of a thickness of the liquid crystal layer. Therefore, a ratio of response speeds of the liquid crystal layers in the respective pixels R, G, and B is expressed by the following formula where a response speed $T_G$ of the pixel G is a reference response speed.

$$T_R : T_G : T_B = 1 : 1 : [1/\{1-(g/d)\}^2]$$

Note that a response speed of liquid crystal is correlative to a voltage (output gray scale) to be applied to a liquid crystal layer. Therefore, in order to (substantially) equalize the response speeds of liquid crystal in the pixels for the respective R, G, and B, it is only necessary that a ratio of the amounts of gray scale transitions of the respective pixels R, G, and B satisfy the following relational expression where an amount $S_G$ of gray scale transition in the pixel G is a reference amount of gray scale transition.

$$S_R : S_G : S_B = 1 : 1 : \{1-(g/d)\}^2 \quad (2)$$

The third term of the right side of the relational expression (2) is defined as a 'gray scale conversion parameter' with respect to the reference amount of gray scale transition (a preset amount of gray scale transition in the pixel R or a preset amount of gray scale transition in the pixel G).

The amounts of gray scale transitions in the respective pixels R, G, and B are found on the basis of the gray scale conversion parameters thus calculated. The pieces of image data (output gray scales) of the respective pixels R, G, and G to be applied during the overshooting period are determined.

Figure 7:
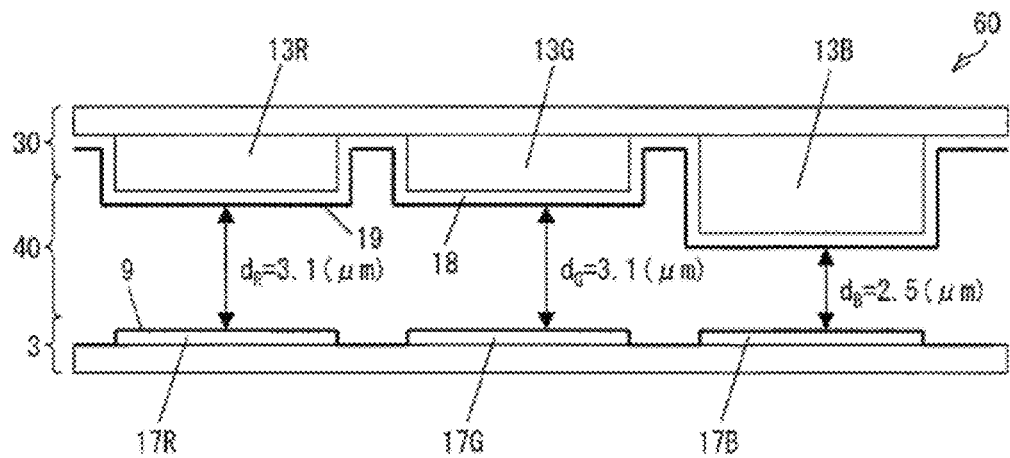
FIG. 7 illustrates a concrete example of Example 2. Specifically.

A concrete example will be described below. In FIG. 7, it is assumed that (i) (the thickness $d_R$ of the liquid crystal layer LR in the pixel R)=(the thickness $d_G$ of the liquid crystal layer LG in the pixel G)=3.1 (μm) and (ii) (the difference g between the thickness of the liquid crystal layer in the pixel R and the thickness of the liquid crystal layer in the pixel B)=(the difference g between the thickness of the liquid crystal layer in the pixel G and the thickness of the liquid crystal layer in the pixel B)=0.6 (μm). This example describes a case in which a gray scale transition of pieces of image data occurs from a gray scale of 32 to a gray scale of 160 (i.e., a case in which pieces of image data of a frame which is one frame before a current frame has a gray scale of 32 and pieces of image data of the current frame has a gray scale (input gray scale) of 160).

Here, the amounts of gray scale transitions (overshooting amounts) in the pixel B is calculated using the pixel R and the pixel G as a reference. First, reference amounts of gray scale transitions in the respective pixels R and G are determined by measuring response speeds of liquid crystal in the respective pixels R and G. In a case where the amounts of gray scale transitions in the respective pixels R and G are determined to be, for example, a gray scale of 33 (reference amount of gray scale transition) on the basis of measured response speeds, the amount of gray scale transition in the pixel B is calculated as follows on the basis of the gray scale conversion parameter of the relational expression (2).

[amount of grey scale transition in pixel B] = [reference amount of grey scale transition] ×

= [grey scale conversion parameter]

= 33 (grey scale) ×

$\{1 - (0.6/3.1)\}^2$

= 21 (grey scale)

Thus, the output gray scales of the pieces of image data (data having been subjected to the gray scale conversion) of the respective pixels R, G, and B in the overshooting period are calculated as follows.

[output grey scale of pixel R] = [input gray scale of current frame] +
[amount of grey scale transition]
= 160 (grey scale) + 33 (grey scale)
= 193 (grey scale)

[output grey scale of pixel G] = [input gray scale of current frame] +
[amount of grey scale transition]
= 160 (grey scale) + 33 (grey scale)
= 193 (grey scale)

[output grey scale of pixel B] = [input gray scale of present frame] +
[amount of grey scale transition]
= 160 (grey scale) + 21 (grey scale)
= 181 (grey scale)

The image data signals DAT are generated on the basis of the output gray scales thus calculated (pixel R: a gray scale of 193, pixel G: a gray scale of 193, pixel B: a gray scale of 181). The data signals are supplied to the liquid crystal panel 60 in accordance with the image data signals DAT. Specifically, in the first frame (the frame which comes immediately after the gray scale has changed), the overshooting process is carried out with respect to input image data (input gray scale) of a gray scale of 160, so that a data signal corresponding to a gray scale of 193 for the pixel R, a data signal corresponding to a gray scale of 193 for the pixel G, and a data signal corresponding to a gray scale of 181 for the pixel B are supplied to the liquid crystal panel 60. In the second frame, data signals corresponding to the target input gray scales (pixel R: a gray scale of 160, pixel G: a gray scale of 160, pixel B: a gray scale of 160) are supplied to the liquid crystal panel 60.

Here, gray scale values (output gray scales), calculated as described above, of the pieces of data having been subjected to the respective gray scale conversions are shown in respective tables shown in (a) and (b) of FIG. 8. In the example, in which the respective pixels R and G serve as the reference, the gray scale values of the respective R and G pixels having been subjected to the overshooting process are in advance determined to be values shown in (a) of FIG. 8 on the basis of a measured result of the response speeds. The gray scale value of the pixel B during the overshooting period is calculated as shown in (b) of FIG. 8 on the basis of the gray scale value shown in (a) of FIG. 8 and the gray scale conversion parameter in the relational expression (2). The tables shown in (a) and (b) of FIG. 8 are stored as the LUTs (the LUTs for respective G, R, and B) in the ROM 26.

Needless to say, the configuration of Example 2 can attain the same effect attained by the configuration described in Example 1.

As described above, with the configuration of the liquid crystal display device, it is possible to obtain the output gray scales that equalize the response speeds of liquid crystal in the respective pixels R, G, and B, by carrying out the overshooting processes with respect to the input gray scales on the basis of the gray scale conversion parameter(s) shown in the relational expressions (1) and (2).

Note here that the 'gray scale conversion parameter(s)' can be generalized into values described below, in consideration of a configuration in which a difference in thickness of the liquid crystal layer between a pair of pixels is different from a difference in thickness of the liquid crystal layer between another pair of pixels. The thickness $d_R$ (µm) of the liquid crystal layer LR in the pixel R and the thickness $d_B$ (µm) of the liquid crystal layer LB in the pixel B are expressed as follows, where d (µm) is the thickness $d_G$ of the liquid crystal layer LG in the pixel G, x (µm) is the difference ($d_R-d_G$) between the thickness $d_G$ of the liquid crystal layer LG in the pixel G and the thickness $d_R$ of the liquid crystal layer LR in the pixel R, and y (µm) is the difference ($d_G-d_B$) between the thickness $d_G$ of the liquid crystal layer LG in the pixel G and the thickness $d_B$ of the liquid crystal layer LB in the pixel B. Note that the liquid crystal layers LR, LG, and LB meet a relation (the thickness of the liquid crystal layer LR in the pixel R)>(the thickness of the liquid crystal layer LG in the pixel G)>(the thickness of the liquid crystal layer LB in the pixel B).

[thickness $d_R$ of liquid crystal layer LR in pixel R]=
(d+x)

[thickness $d_B$ of liquid crystal layer LB in pixel B]=
(d−y)

The thicknesses of the liquid crystal layers in the respective pixels R, G, and B are described as follows as a ratio. Note here that the thickness of the liquid crystal layer LG in the pixel G is a reference thickness.

$$d_R : d_G : d_B = (d+x) : d : (d-y)$$
$$= \{1+(x/d)\} : 1 : \{1-(y/d)\}$$

A ratio of the response speeds of liquid crystal in the respective pixels R, G, and B is expressed as follows, where a response speed $T_G$ of the liquid crystal in the pixel G is a reference response speed.

$$T_R:T_G:T_B=[1/\{1+(x/d)\}^2]:1:[1/\{1-(y/d)\}^2]$$

A ratio of amounts of gray scale transitions in the respective pixels R, G, and B can be expressed by the following relational expression, where an amount $S_G$ of gray scale transition in the pixel G is a reference amount of gray scale transition. Thus, the gray scale conversion parameters can be generalized.

$$S_R:S_G:S_B=[\{1+(x/d)\}^2]:1:[\{1-(y/d)\}^2]$$

The amount $S_R$ of gray scale transition in the pixel R and the amount $S_B$ of gray scale transition in the pixel B are respectively expressed as follows.

$$S_R=S_G\times\{1+(x/d)\}^2$$

$$S_B=S_G\times\{1-(y/d)\}^2$$

With the gray scale conversion parameters thus obtained, it is possible to calculate pieces of image data (output gray scales) of the respective pixels R, G, and B which are applied during the overshooting period so as to equalize the response speeds of liquid crystal in the respective pixels R, G, and B, even in a configuration in which there is a difference in thickness between respective two of the liquid crystal layers in the respective pixels R, G, and B.

Note here that the liquid crystal display device described in the present embodiment is preferably driven in a vertical alignment mode (VA mode; Vertically Aligned Mode), in which liquid crystal molecules are aligned substantially vertical to a substrate surface when no voltage is applied to a liquid crystal layer. This makes it possible to attain high contrast and a wide viewing angle characteristic, so that the display quality can be further improved. Note that the liquid crystal display device is not limited to be driven in the VA mode but can be driven in other mode or by a known driving method.

Figure 9:
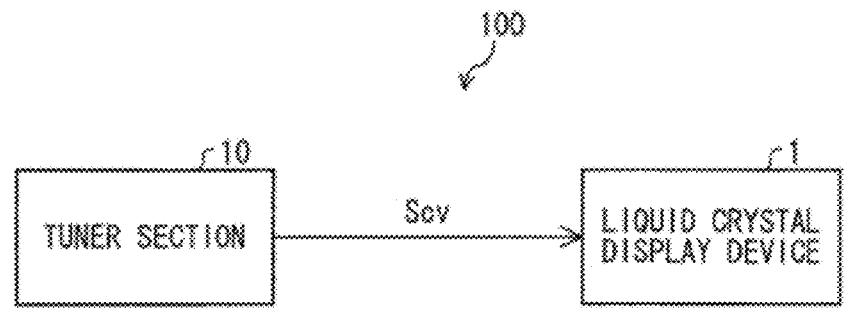
FIG. 9 is a block diagram illustrating a television receiver in accordance with the present embodiment.
Figure 10:
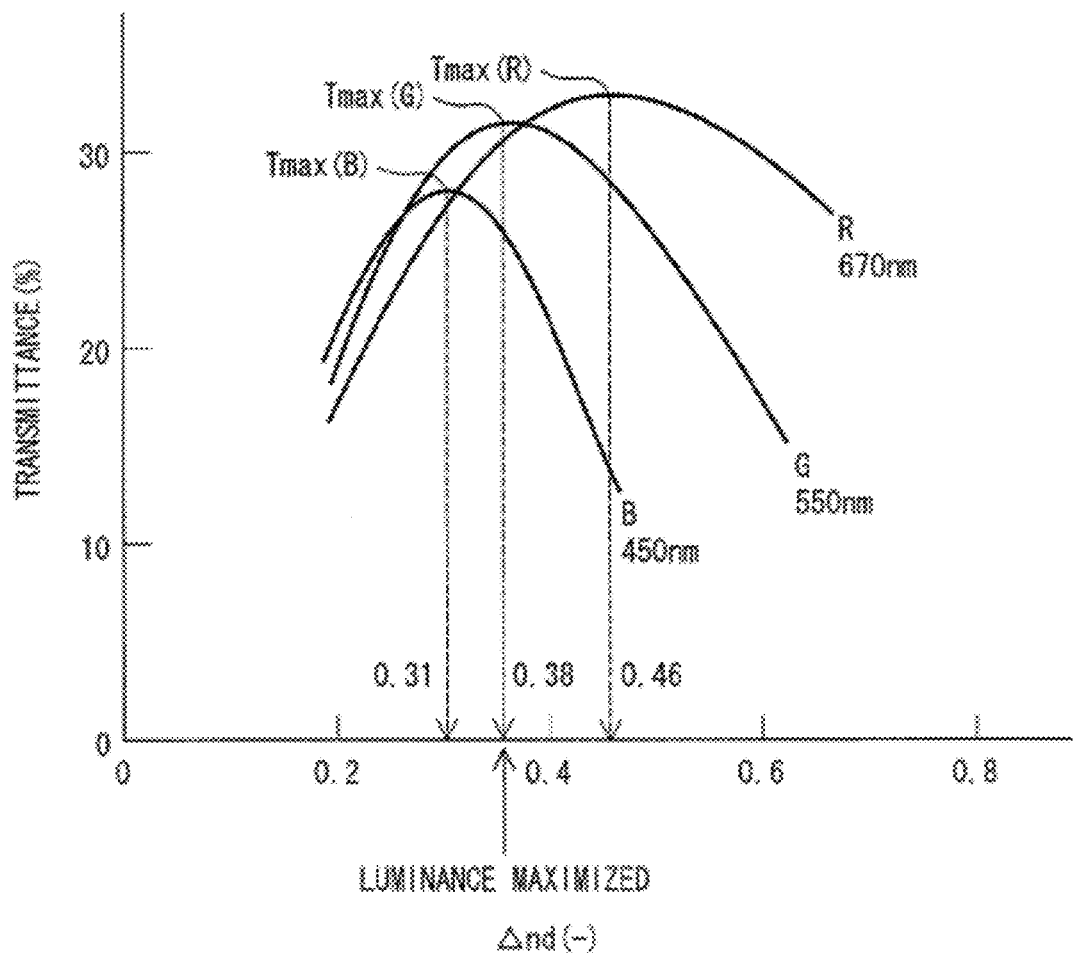
FIG. 10 is a diagram illustrating a relation between transmittance and retardation of a liquid crystal at each wavelength in a liquid crystal panel of a VA mode.

Finally, the following description will discuss a television receiver 100 including the liquid crystal display device 1. In a case where the liquid crystal display device 1 displays an image compliant with a television broadcast, the television receiver 100 is constituted by the liquid crystal display device 1 and a tuner section 10 connected with the liquid crystal display device 1, as illustrated in FIG. 9. The tuner section 10 extracts a signal of a channel to be received from among reception waves (high frequency signals) via an antenna (not shown) and then converts an extracted signal into a middle frequency signal. The tuner section 10 extracts a composite color video signal Scv as a television signal by detecting the middle frequency signal. The composite color video signal Scv is supplied to the liquid crystal display device 1 as early described, and an image is displayed, in response to the composite color video signal Scv, by the liquid crystal display device 1.

The liquid crystal display device can employ a configuration in which the first through third output gray scales are set for the first through third pixels, respectively, so that the first through third liquid crystal layers have an identical response speed in liquid crystal.

This eliminates a difference in response speed between the respective pixels, so that a color drift can be avoided during video display.

The liquid crystal display device can employ a configuration in which the first through third output gray scales are calculated by adding or subtracting, to or from the first through third input gray scales, respectively, an amount of gray scale transition and in a case where an amount of gray scale transition in the second pixel is preset, (i) an amount of gray scale transition in the first pixel is calculated on the basis of (a) the thickness of the second liquid crystal layer and (b) a difference in thickness between the first liquid crystal layer and the second liquid crystal layer and (ii) an amount of gray scale transition in the third pixel is calculated on the basis of (c) the thickness of the second liquid crystal layer and (d) a difference in thickness between the second liquid crystal layer and the third liquid crystal layer.

The liquid crystal display device can employ a configuration in which the amount of gray scale transition in the first pixel is expressed by $a \times \{1+(x/d)\}^2$, and the amount of gray scale transition in the third pixel is expressed by $a \times \{1-(y/d)\}^2$, where d is the thickness of the second liquid crystal layer, x is the difference in thickness between the first liquid crystal layer and the second liquid crystal layer ((the thickness of the first liquid crystal layer)>(the thickness of the second liquid crystal layer)), y is the difference in thickness between the second liquid crystal layer and the third liquid crystal layer ((the thickness of the second liquid crystal layer)>(the thickness of the third liquid crystal layer)), and a is the amount of gray scale transition in the second pixel.

The liquid crystal display device can employ a configuration in which the first through third output gray scales are calculated by adding or subtracting, to or from the first through third input gray scales, respectively, an amount of gray scale transition and in a case where amounts of gray scale transitions in the respective first and second pixels are preset, an amount of gray scale transition in the third pixel is calculated on the basis of (i) the thickness of the first or second liquid crystal layer and a difference in thickness between the first or second liquid crystal layer and the third liquid crystal layer.

The liquid crystal display device can employ a configuration in which the amount of gray scale transition in the third pixel is expressed by $a \times \{1-(x/d)\}^2$, where d is the thickness of the first liquid crystal layer and is also the thickness of the second liquid crystal layer, x is the difference in thickness between the first or second liquid crystal layer and the third liquid crystal layer ((the thickness of the first liquid crystal layer)=(the thickness of the second liquid crystal layer)>(the thickness of the third liquid crystal layer)), and a is the amount of gray scale transition in the first pixel and is also the amount of gray scale transition in the second pixel.

The liquid crystal display device can employ a configuration in which the liquid crystal display device further includes first through third look-up tables respectively provided for the first through third pixels, in each of the first through third look-up tables (i) corresponding input gray scales of the current frame, (ii) corresponding gray scales of the frame which is one frame before the current frame, and (iii) corresponding output gray scales being associated with one another, respectively, the gray scale transition emphasis process section setting the first through third output gray scales for the first through third pixels, respectively, by referring to corresponding one of the first through third look-up tables.

The liquid crystal display device can employ a configuration in which a first color for the first pixel has a wavelength longer than that of a second color for the second pixel, and the second color for the second pixel has a wavelength longer than that of a third color for the third pixel.

The liquid crystal display device can employ a configuration in which the first color is red, the second color is green, and the third color is blue.

The liquid crystal display device can employ a configuration in which the liquid crystal display device is driven in a VA mode. This makes it possible to attain high contrast and a wide viewing angle characteristic, so that the display quality can be further improved.

The television receiver has a feature in including the liquid crystal display device and a tuner section for receiving television broadcasts.

The present invention is not limited to the above-described embodiments. An embodiment obtained by appropriately modifying the embodiments on the basis of a known technique or common technical knowledge and an embodiment obtained by combining modified embodiments will also be included in the embodiments of the present invention. Note that the advantageous effects and the like described in the embodiments are illustrative only.

Industrial Applicability

The liquid crystal display device of and the circuit for driving same of the present invention are suitable, for example, for a liquid crystal TV.

| Reference Signs List | |
|---|---|
| 1: | liquid crystal display device |
| 20: | display control circuit |
| 21: | frame memory control section |
| 22: | overshooting process section (gray scale transition emphasis process section) |
| 23: | liquid crystal control section |
| 24: | frame memory |
| 25: | ROM |
| 60: | liquid crystal panel |
| 80: | gate driver |
| 90: | source driver |
| 100: | television receiver |
| PR: | pixel R (first pixel) |
| PG: | pixel G (second pixel) |
| PB: | pixel B (third pixel) |
| LR: | liquid crystal layer of pixel R (first liquid crystal layer) |

Reference Signs List

| | |
|---|---|
| LG: | liquid crystal layer of pixel G (second liquid crystal layer) |
| LB: | liquid crystal layer of pixel B (third liquid crystal layer) |
| LUT: | look-up table |

The invention claimed is:

1. A liquid crystal display device comprising:
a plurality of scanning signal lines;
a plurality of data signal lines;
a first pixel including a first liquid crystal layer;
a second pixel including a second liquid crystal layer having a thickness smaller than a thickness of the first liquid crystal layer;
a third pixel including a third liquid crystal layer having a thickness smaller than the thickness of the second liquid crystal layer; and
a gray scale transition emphasis process section for respectively setting first through third output gray scales of a current frame on the basis of (i) first through third input gray scales of the current frame and (ii) first through third gray scales of a frame which is one frame before the current frame,
the first through third output gray scales being respectively set for the first through third pixels in accordance with the thicknesses of the respective first through third liquid crystal layer so that (i) the second output gray scale for the second pixel is higher than the third output gray scale for the third pixel and (ii) the first output gray scale for the first pixel is higher than the second output gray scale, in a case where the first through third pixels display an identical gray scale, wherein:
the first through third output gray scales are calculated by adding or subtracting, to or from the first through third input gray scales, respectively, an amount of gray scale transition and
in a case where an amount of gray scale transition in the second pixel is preset, (i) an amount of gray scale transition in the first pixel is calculated on the basis of (a) the thickness of the second liquid crystal layer and (b) a difference in thickness between the first liquid crystal layer and the second liquid crystal layer and (ii) an amount of gray scale transition in the third pixel is calculated on the basis of (c) the thickness of the second liquid crystal layer and (d) a difference in thickness between the second liquid crystal layer and the third liquid crystal layer.

2. The liquid crystal display device of claim 1, wherein the first through third output gray scales are set for the first through third pixels, respectively, so that the first through third liquid crystal layers have an identical response speed in liquid crystal.

3. The liquid crystal display device of claim 1, wherein:
the amount of gray scale transition in the first pixel is expressed by $a \times \{1+(x/d)\}^2$, and
the amount of gray scale transition in the third pixel is expressed by $a \times \{1-(y/d)\}^2$, where d is the thickness of the second liquid crystal layer, x is the difference in thickness between the first liquid crystal layer and the second liquid crystal layer ((the thickness of the first liquid crystal layer)>(the thickness of the second liquid crystal layer)), y is the difference in thickness between the second liquid crystal layer and the third liquid crystal layer ((the thickness of the second liquid crystal layer)>(the thickness of the third liquid crystal layer)), and a is the amount of gray scale transition in the second pixel.

4. A liquid crystal display device of claim 1, further comprising:
first through third look-up tables respectively provided for the first through third pixels, in each of the first through third look-up tables (i) corresponding input gray scales of the current frame, (ii) corresponding gray scales of the frame which is one frame before the current frame, and (iii) corresponding output gray scales being associated with one another, respectively,
the gray scale transition emphasis process section setting the first through third output gray scales for the first through third pixels, respectively, by referring to corresponding one of the first through third look-up tables.

5. The liquid crystal display device of claim 1, wherein a first color for the first pixel has a wavelength longer than that of a second color for the second pixel, and the second color for the second pixel has a wavelength longer than that of a third color for the third pixel.

6. The liquid crystal display device of claim 5, wherein the first color is red, the second color is green, and the third color is blue.

7. The liquid crystal display device of claim 1, wherein the liquid crystal display device is driven in a VA mode.

8. A television receiver comprising a liquid crystal display device recited in claim 1 and a tuner section for receiving television broadcasts.

9. A liquid crystal display device comprising:
a plurality of scanning signal lines;
a plurality of data signal lines;
a first pixel including a first liquid crystal layer;
a second pixel including a second liquid crystal layer having a thickness equal to a thickness of the first liquid crystal layer;
a third pixel including a third liquid crystal layer having a thickness smaller than the thickness of the first liquid crystal layer and the thickness of the second liquid crystal layer; and
a gray scale transition emphasis process section for respectively setting first through third output gray scales of a current frame on the basis of (i) first through third input gray scales of the current frame and (ii) first through third gray scales of a frame which is one frame before the current frame,
the first through third output gray scales being respectively set for the first through third pixels in accordance with the thicknesses of the respective first through third liquid crystal layers at least so that the first and second output gray scales for the first and second pixels, respectively, are higher than the third output gray scale for the third pixel, in a case where the first through third pixels display an identical gray scale, wherein:
the first through third output gray scales are calculated by adding or subtracting, to or from the first through third input gray scales, respectively, an amount of gray scale transition and
in a case where amounts of gray scale transitions in the respective first and second pixels are preset, an amount of gray scale transition in the third pixel is calculated on the basis of (i) the thickness of the first or second liquid crystal layer and a difference in thickness between the first or second liquid crystal layer and the third liquid crystal layer.

10. The liquid crystal display device of claim 9, wherein:
the amount of gray scale transition in the third pixel is expressed by $a \times \{1-(x/d)\}^2$, where d is the thickness of the first liquid crystal layer and is also the thickness of the second liquid crystal layer, x is the difference in thickness between the first or second liquid crystal layer and the third liquid crystal layer ((the thickness of the first liquid crystal layer)=(the thickness of the second liquid crystal layer)>(the thickness of the third liquid crystal layer)), and a is the amount of gray scale transition in the first pixel and is also the amount of gray scale transition in the second pixel.

11. A driving method for driving a liquid crystal display device, said liquid crystal display device including:
a plurality of scanning signal lines;
a plurality of data signal lines;
a first pixel including a first liquid crystal layer;
a second pixel including a second liquid crystal layer having a thickness smaller than a thickness of the first liquid crystal layer; and
a third pixel including a third liquid crystal layer having a thickness smaller than the thickness of the second liquid crystal layer,
said driving method comprising the step of:
respectively setting first through third output gray scales of a current frame on the basis of (i) first through third input gray scales of the current frame and (ii) first through third gray scales of a frame which is one frame before the current frame,
the first through third output gray scales being respectively set for the first through third pixels in accordance with the thicknesses of the respective first through third liquid crystal layers so that (i) the second output gray scale for the second pixel is higher than the third output gray scale for the third pixel and (ii) the first output gray scale for the first pixel is higher than the second output gray scale, in a case where the first through third pixels display an identical gray scale, wherein:
the first through third output gray scales are calculated by adding or subtracting, to or from the first through third input gray scales, respectively, an amount of gray scale transition and
in a case where an amount of gray scale transition in the second pixel is preset, (i) an amount of gray scale transition in the first pixel is calculated on the basis of (a) the thickness of the second liquid crystal layer and (b) a difference in thickness between the first liquid crystal layer and the second liquid crystal layer and (ii) an amount of gray scale transition in the third pixel is calculated on the basis of (c) the thickness of the second liquid crystal layer and (d) a difference in thickness between the second liquid crystal layer and the third liquid crystal layer.

12. A driving method for driving a liquid crystal display device, said liquid crystal display device including:
a plurality of scanning signal lines;
a plurality of data signal lines;
a first pixel including a first liquid crystal layer;
a second pixel including a second liquid crystal layer having a thickness equal to a thickness of the first liquid crystal layer; and
a third pixel including a third liquid crystal layer having a thickness smaller than the thickness of the first liquid crystal layer and the thickness of the second liquid crystal layer,
said driving method comprising the step of:
respectively setting first through third output gray scales of a current frame on the basis of (i) first through third input gray scales of the current frame and (ii) first through third gray scales of a frame which is one frame before the current frame,
the first through third output gray scales being respectively set for the first through third pixels in accordance with the thicknesses of the respective first through third liquid crystal layers at least so that the first and second output gray scales for the first and second pixels, respectively, are higher than the third output gray scale for the third pixel, in a case where the first through third pixels display an identical gray scale, wherein:
the first through third output gray scales are calculated by adding or subtracting, to or from the first through third input gray scales, respectively, an amount of gray scale transition and
in a case where amounts of gray scale transitions in the respective first and second pixels are preset an amount of gray scale transition in the third pixel is calculated on the basis of (i) the thickness of the first or second liquid crystal layer and a difference in thickness between the first or second liquid crystal layer and the third liquid crystal layer.

* * * * *